United States Patent
Graf et al.

(10) Patent No.: US 6,311,114 B1
(45) Date of Patent: Oct. 30, 2001

(54) CONTROLLER FOR AN AUTOMATIC MOTOR VEHICLE TRANSMISSION

(75) Inventors: Friedrich Graf, Regensburg; Werner Hauptmann, Höhenkirchen; Kai Heesche, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/583,987

(22) Filed: May 30, 2000

Related U.S. Application Data

(63) Continuation of application No. PCT/DE98/03350, filed on Nov. 16, 1998.

(30) Foreign Application Priority Data

Nov. 27, 1997 (DE) .............................. 197 52 623

(51) Int. Cl.⁷ ................................................ F16H 59/50
(52) U.S. Cl. ................................................ 701/57; 701/51
(58) Field of Search ................... 701/51, 55, 56, 701/57, 58

(56) References Cited

U.S. PATENT DOCUMENTS

| | | |
|---|---|---|
| 5,031,100 | 7/1991 | Takahashi . |
| 5,157,609 * | 10/1992 | Stehle et al. ............... 701/56 |
| 5,303,153 * | 4/1994 | Sakai et al. ............... 701/57 |
| 5,361,207 * | 11/1994 | Hayafune ............... 701/57 |
| 5,390,117 * | 2/1995 | Graf et al. ............... 701/57 |
| 5,557,521 * | 9/1996 | Danz et al. ............... 701/57 |
| 5,748,472 * | 5/1998 | Gruhle et al. ............ 701/51 |
| 5,913,916 * | 6/1999 | Bai et al. ................ 701/59 |
| 5,957,990 * | 9/1999 | Graf et al. ............... 701/57 |

FOREIGN PATENT DOCUMENTS

| | | |
|---|---|---|
| 42 15 406 | 11/1993 | (DE) . |
| 43 12 415 | 10/1994 | (DE) . |
| 0 576 703 | 1/1994 | (EP) . |
| 0 645 559 | 3/1995 | (EP) . |

OTHER PUBLICATIONS

Published International Application No. WO 97/25555 (Graf), dated Jul. 17, 1997, as mentioned on p. 2 of the specification.

"Ein auf Fuzzy–Methoden basierendes Situations–Handlungsmodell des Fahrerverhaltens" (Wolter et al.), dated 1997, ATZ Automobiltechnische Zeitschrift 99, pp. 142–147, pertains to a driver model based on Fuzzy methods.

"Fuzzy–Neuro–Systeme '95", (Petersen), Technische Hochschule Darmstadt, Gesellschaft für Informatik e.V., pp. 123–130, pertains to Fuzzy–Neuro–Systems 1995, as mentioned on p. 2 of the specification.

* cited by examiner

*Primary Examiner*—Michael J. Zanelli
*Assistant Examiner*—Eric M. Gibson
(74) *Attorney, Agent, or Firm*—Herbert L. Lerner; Laurence A. Greenberg; Werner H. Stemer

(57) ABSTRACT

A controller has characteristic diagram memories and a fuzzy system which detects operating parameters of a motor vehicle and sets a transmission ratio with the aid of the characteristic diagram memory. A driver inputs plus and minus gear shift instructions via an input device. The driver instructions are evaluated during a driving operation by an adaptation circuit, and the shifting behavior of a transmission is adapted to a desired shifting behavior.

9 Claims, 3 Drawing Sheets

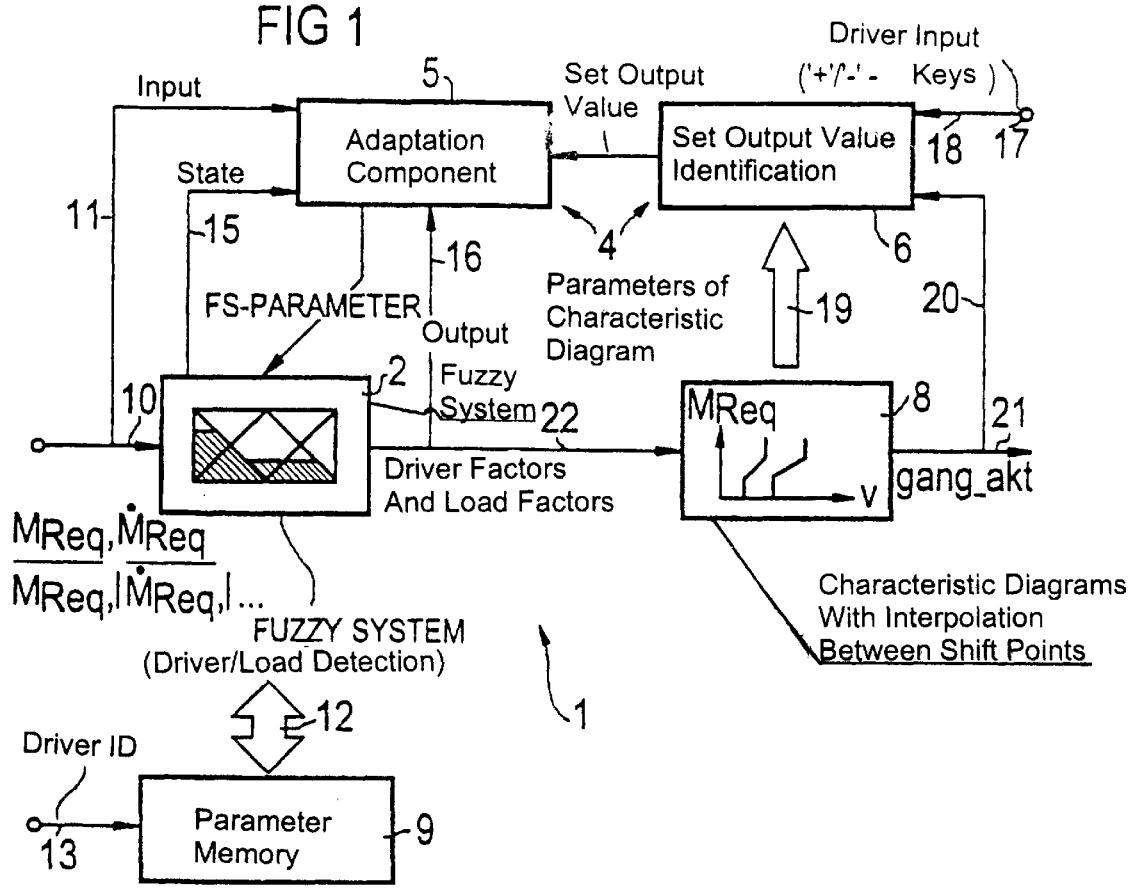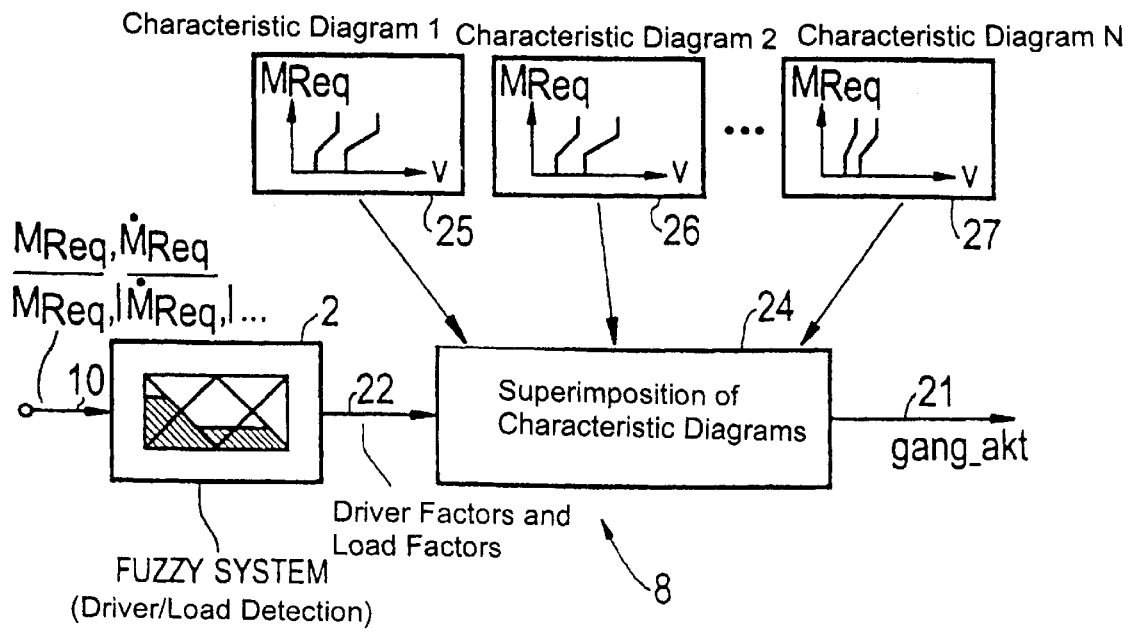

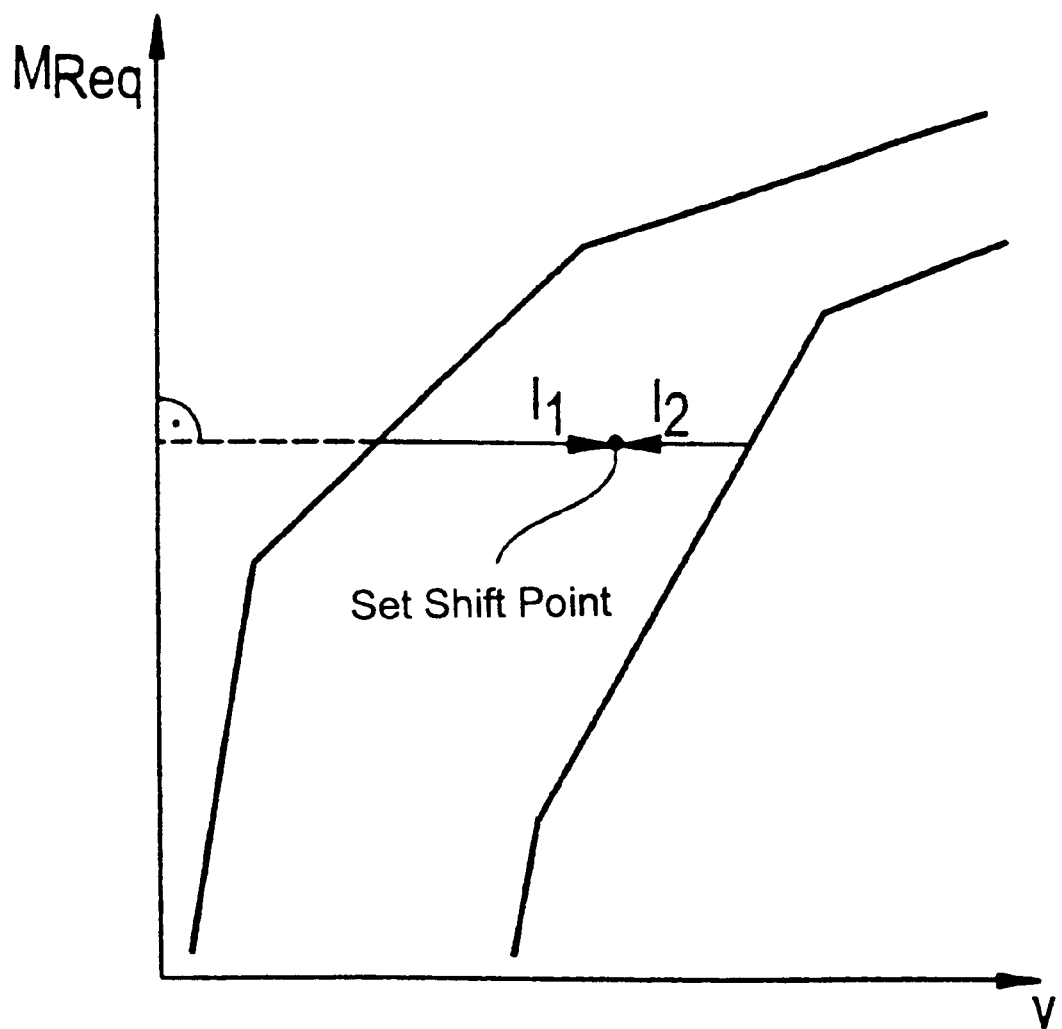

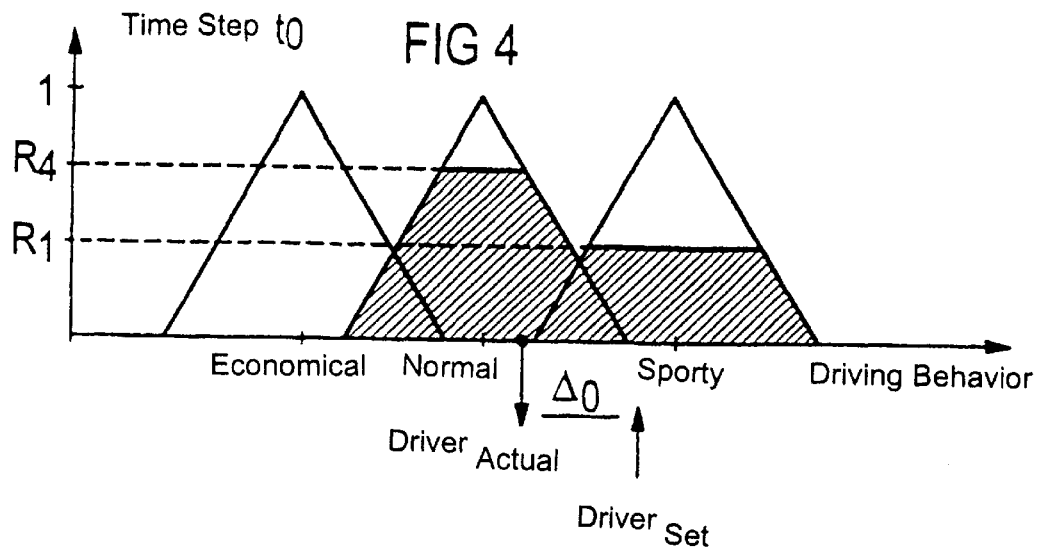
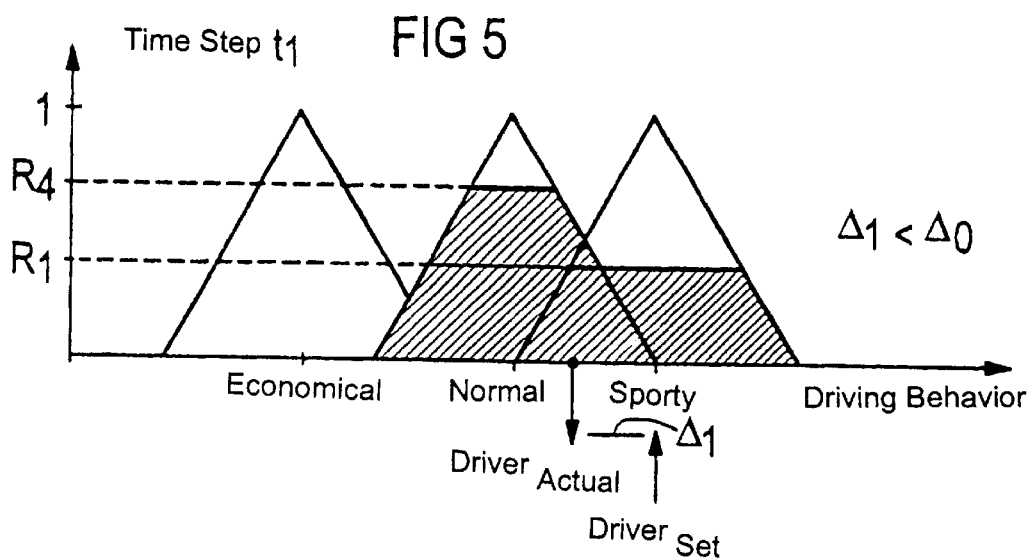
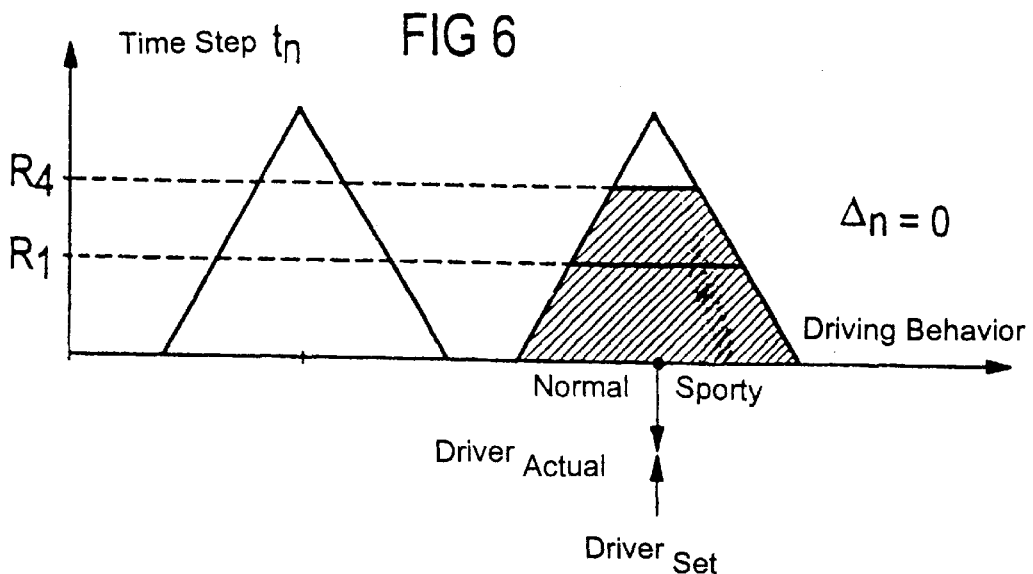

CONTROLLER FOR AN AUTOMATIC MOTOR VEHICLE TRANSMISSION

CROSS-REFERENCE TO RELATED APPLICATION

This application is a continuation of copending International Application No. PCT/DE98/03350, filed Nov. 16, 1998, which designated the United States.

BACKGROUND OF THE INVENTION

FIELD OF THE INVENTION

The invention relates to a controller for an automatic motor vehicle transmission.

Conventional controllers for a motor vehicle transmission use stored gear shift characteristic diagrams and shift the gears as a function of at least a position of the accelerator pedal and the vehicle speed. Moreover, the load state of the motor vehicle and the driving style of the driver are taken into account. A fuzzy-logic controller is used to evaluate various signals which report the operating states of the motor vehicle. Then a plurality of control signals are generated with the aid of which, inter alia, one of a plurality of gear shift characteristic diagrams is selected. Such a controller is for example described in Published European Patent Application EP 0 576 703 A1.

The article "Gleitende Schaltpunktermittlung beim Volkswagen-Automatikgetriebe AG4 mittels Fuzzy-Logik" ["Sliding shift point determination in the AG4 Volkswagen automatic transmission by fuzzy logic"], Fuzzy-Neuro-Systeme 1995, by R. Petersen, proposes a continuous shift point determination based on a fuzzy-logic. The shift point determination selects the shift point via an interpolation between in each case two base characteristics. In this case, only a one-dimensional evaluation is carried out between two characteristics (Eco, Sport) by determining a so-called sportiness factor.

Published European Patent Application EP 0 645 559 A1 describes a transmission control, in which the driver acts in a manual gear shifting mode as a teacher for a neuronal network (supervised learning). Here, not only an evaluation of the shift instant carried out by the driver, but an explicit training mode are provided. In this case, it is necessary during a training phase for a driver skilled in manual shifting to train the system, that is to say to prescribe a gear selection, in order to achieve a targeted adaptation.

International Publication No. WO 97/25555 describes a control system for shifting an automatic transmission. The control system has a classification system, configured as a fuzzy system, for classifying the driving style, the respective driving maneuver or the road type. Depending on this classification, the transmission ratio is set with the aid of transmission ratio selection patterns which are stored in a memory. Manual gear shift instructions of the driver are evaluated in an evaluation circuit, and as a function thereof the gear shifting of the transmission is adapted to the gear shifting desired by the driver with the aid of a parameterization circuit and/or a selection circuit.

SUMMARY OF THE INVENTION

It is accordingly an object of the invention to provide a controller for an automatic motor vehicle transmission which overcomes the above-mentioned disadvantages of the heretofore-known controllers of this general type and which uses shifting decisions of the driver during the driving operation to adapt simply and effectively to the gear shifting the driver desires. The driver should not be required to select a particular learning mode of the transmission controller.

With the foregoing and other objects in view there is provided, in accordance with the invention, a controller for an automatic motor vehicle transmission, including:

characteristic diagram memories for storing a transmission shifting behavior as a function of vehicle operating parameters, the transmission shifting behavior being stored as characteristics including at least one of limit shift points and limit shift characteristic curves;

a fuzzy system connected to the characteristic diagram memories, the fuzzy system detecting the vehicle operating parameters and a vehicle load state and setting a transmission ratio as a function of the vehicle operating parameters and the vehicle load state by using the characteristic diagram memories;

an input device for inputting driver instructions including plus shift instructions and minus shift instructions; and an adaptation circuit connected to the input device and to the fuzzy system, the adaptation circuit evaluating the driver instructions during a driving operation for adapting the transmission shifting behavior to a driver-desired transmission shifting behavior, and the adaptation circuit superimposing two of the characteristics stored in the characteristic diagram memories in a weighted fashion for setting a transmission shift point.

The advantages of the invention are, in particular, that in a normal driving operation the driver intervenes by simple gear shift instructions, that is to say the driver communicates his or her wishes with respect to the driving behavior to the transmission controller. Since the invention is based on an interpolation between characteristic diagrams, the gear shifting of the transmission is not represented exclusively by a neuronal network, in which an undesired shifting characteristic could be learned due to faulty inputs.

The shift points or the transmission ratios of the transmission are stored as a function of operating parameters of the motor vehicle in characteristic diagrams of the transmission control. The operating parameters include, for example, a position of the accelerator pedal and the motor vehicle speed, or else the set engine speed, the set transmission ratio, the set engine torque or the set wheel torque.

In accordance with another feature of the invention, the adaptation circuit superimposes two of the limit shift points or limit shift characteristic curves stored in the characteristic diagram memories in a weighted fashion for setting the transmission shift point.

In accordance with a further feature of the invention, the adaptation circuit determines a set transmission shift point from at least one of the driver instructions, and weights the limit shift points by a respective distance from the set transmission shift point.

In accordance with another feature of the invention, the adaptation circuit determines a set transmission shift point from at least one of the driver instructions, and weights the limit shift points by a respective proximity to the set transmission shift point, the respective proximity is calculated using the following equation $$D_i = 1 - \frac{|l_i|}{\sum_i |l_i|} \in [0, 1]$$

wherein $D_i$ is a proximity of a shift characteristic curve i to a given shift point, and $l_i$ is a distance between a shift point and a shift characteristic curve i.

In accordance with yet another feature of the invention, a characteristic diagram circuit is connected to the fuzzy system for superimposing three of the limit shift characteristic curves, such as limit shift characteristic curves for extremely economical driving, extremely sporty driving and high load driving.

In accordance with an additional feature of the invention, the fuzzy system supplies output signals including a load output signal and a driver behavior output signal, the output signals of the fuzzy system are prioritized such that only an adaptation of the load output signal of a fuzzy classifier is performed when a load situation is detected, and such that only an adaptation of the driver behavior output signal is performed when no load situation is detected.

In accordance with another feature of the invention, an identification memory can be connected to the fuzzy system. The identification memory stores respective driving behaviors for drivers in the form of driver-specific data records obtained during an adaptation process.

In accordance with yet another feature of the invention, an external data memory is provided for storing respective driving behaviors for drivers in the form of driver-specific data records obtained during an adaptation process.

Other features which are considered as characteristic for the invention are set forth in the appended claims.

Although the invention is illustrated and described herein as embodied in a controller for an automatic motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram of a controller according to the invention for an automatic transmission;

FIG. 2 is a schematic block diagram of a fuzzy system and a characteristic diagram superimposition circuit of the controller according to FIG. 1;

FIG. 3 is a diagram for explaining the operation of the characteristic diagram superimposition circuit according to FIG. 2; and FIGS. 4 to 6 are diagrams illustrating association functions of the output variable of the fuzzy system according to FIG. 2 for the driver behavior, the diagrams illustrate the adaptation of the fuzzy system to the driver's wishes.

Description of the Preferred Embodiments

Referring now to the figures of the drawings in detail and first, particularly, to FIG. 1 thereof, there is shown a controller 1 for an automatic motor vehicle transmission— denoted below as transmission controller 1. The transmission controller 1 includes a fuzzy system 2, an adaptation circuit 4, which is formed of an adaptation component 5 and an identification circuit 6, a characteristic diagram circuit 8 and a parameter or identification memory 9.

Via an input line 10, the fuzzy system 2 receives signals which correspond to the position of the throttle or the accelerator pedal, (not illustrated here but in principle shown in Published European Patent Application EP 0 576 703 A1), or signals derived therefrom: a torque requirement $M_{req}$ corresponding to the throttle position or the accelerator pedal value of the motor vehicle, the time derivative of the value of the torque requirement $\dot{M}_{Req}$ the average value of the torque requirement value $\overline{M}_{Req}$ and the average value of the absolute value of the derivative of the torque requirement value $$\overline{|\dot{M}_{req}|}.$$

Alternatively, the fuzzy system 2 can also detect the set or desired engine torque, the set wheel torque and variables derived therefrom. The respective input values also pass via a signal line 11 to an input of the adaptation component 5.

The fuzzy system 2 exchanges data with the parameter memory 9 via a bidirectional data line 12. This memory receives a driver identification via an input line 13. Information on the state of the fuzzy system 2 passes to the adaptation component 5 via a signal line 15, and the output signals of the fuzzy system 2 are passed to the adaptation component 5 via a signal line 16. The output signals of the fuzzy system 2 are also passed to the characteristic diagram circuit 8 via signal line 22. This adaptation component therefore has exact knowledge of the state and of the data content of the fuzzy system 2.

The driver inputs are supplied to the identification circuit 6 via an input line 18. The driver of the motor vehicle enters his or her inputs via an input element 17, for example a key, a button, an operating rocker, a switching rocker arm or the like, in which case the driver can either shift up by a gear stage—denoted below as a "plus instruction"—or shift down by a gear stage—denoted below as a "minus instruction."

Via a data line 19, the set output value identification circuit 6 receives characteristic diagram parameters from the characteristic diagram circuit 8, and via a signal line 20 it receives the output signal of the characteristic diagram circuit 8. This output signal gang_akt passes via an output line 21 to the automatic transmission of the motor vehicle, which is known per se and not illustrated here, and sets the driving stage or gear speed selected by the transmission controller 1.

The characteristic diagram circuit 8, so far illustrated in a simplified manner, includes a characteristic diagram superimposition circuit 24 (FIG. 2), which is supplied with the output signal of the fuzzy system 2 over signal line 22. The output signal contains the driver factors and load factors known from Published European Patent Application EP 0 576 703 A1. This output signal causes, in the superimposition circuit 24, a superimposition of characteristic diagram data which are stored in a plurality of characteristic diagrams or characteristic maps 25, 26, 27 etc. The transfer of the data from the characteristic diagrams 25 to 27 into the superimposition circuit 24 is indicated in FIG. 2 by arrows. The type of superimposition is further explained below.

The transmission controller 1 adapts its gear shifting behavior continuously to the driver's driving behavior or handling and to the load situation of the vehicle. This is done by selecting a gear through the use of the values, calculated by the fuzzy system 2, for the driver behavior and the load state via interpolation between the various characteristic diagrams 25–27. If the driver does not agree with the gear shifting behavior of the vehicle, it is possible for the driver to use a "−" of the input element 17 to shift down a gear, and to use a "+" key to shift up a gear.

The intervention operation of the driver is passed on to the identification circuit 6 and converted into set output values for the fuzzy system which are transmitted to the adaptation component 5. The adaptation component 5 then adapts the parameters of the fuzzy system 2 in such a way that the transmission controller assumes the gear shift desired by the driver. The parameters, modified in dependence of the driver, of the fuzzy system are stored in the parameter memory 9. Stored in the parameter memory 9 are the parameters for various drivers, wherein the respective parameters are activated via a driver ID or driver identification. The parameter memory 9 can, for example, be integrated into the onboard computer and be addressed via different vehicle keys, or each driver receives his or her own parameter memory in the form of a memory card. If the motor vehicle has a seating position memory for the driver's seat, the identification of a driver can also be performed in conjunction with the seating position stored for the driver.

If, for economic reasons, the parameter memory 9 is dispensed with, the transmission controller 1 can be adapted to the driving behavior of a driver in that, in a learning mode—which is activated temporarily in the motor vehicle workshop, for example—a set of parameters, modified in dependence of the driver, is generated for the fuzzy system 2 and is stored therein.

Starting point for the following explanation of the continuous characteristic diagram modeling according to the invention is the system described in Published European Patent Application EP 0 576 703 A1, wherein one out of N gear shift characteristic diagrams ("1-of-N") is selected. FIG. 2 of Published European Patent Application EP 0 576 703 A1 illustrates that a fuzzy system or fuzzy-logic controller is used to determine a current driver type and a load situation. The characteristic diagrams can also set the variable transmission ratio of a CVT transmission (or the set engine torque which is to be set for the CVT transmission). In order to achieve an improved and online-adaptable gear shifting behavior, that is to say a shifting behavior which is adapted to the driver's driving behavior during the driving operation, the 1-of-N selection is replaced according to the invention by a continuous changing of the shifting characteristic curve.

In the case of a continuous transition between different gear shift characteristic diagrams, the characteristic diagrams 25, 26 and 27 form the starting basis as basic characteristic diagrams, as is illustrated in FIG. 2. In order to determine a shift point, the individual basic characteristic diagrams are superimposed in a weighted fashion via a classification method, with the result that the shift point corresponds as much as possible to that which the driver would have selected in the case of manual shifting. The continuous transition replaces the known individual characteristic diagrams of the 1-of-N selection such as, for example, "economic", "average", "sport", "load 1" and "load 2", by in each case a set of limit characteristic diagrams or "extreme" characteristic diagrams containing limit shift characteristics, for example "extremely economic", "extremely sporty" and "high load". The resulting reduction in the calibration data does result, however, in a slight increase in the computational outlay during operation.

A main advantage of the solution according to the invention is, however, the transparency for the developer, since the developer designs or creates the gear shift characteristic diagrams largely as before. Moreover, the outlay for calibrating intermediate characteristic diagrams (it is normally necessary to define 60 interpolation points for this purpose in the case of a four-speed automatic transmission) is thereby eliminated.

In order to achieve the continuous transition between the characteristic diagrams, an interpolation is carried out between shift points, during which the shift points of different gear shift characteristic diagrams 25–27 are superimposed upon one another in a weighted fashion, wherein the shift characteristic curves SKL need only be available as a function $$v_{sp}(M_{Req}) = SKL(M_{Req}). \tag{1}$$

This function is used to calculate the shift point speed $v_{sp}$ resulting for a given accelerator pedal value or torque requirement value $M_{Req}$. A shift up or shift down is performed when the shift point speed is exceeded or undershot. All the gear shift characteristic diagrams 25–27 are thus active at the same time and contribute to calculating the current shift point.

An example for the interpolation between two shift points is illustrated in FIG. 3. For each shift characteristic $SKL_i$ their current shift point speed $v_{sp,i}$ is determined and thereafter the individual shift point speeds are added, weighted linearly via $w_{sp,i}$, to produce the resulting shift point speed $v_{sp}$:

$$v_{sp}(M_{Req}) = \frac{\sum_i w_{sp,i} \cdot v_{sp,i}(M_{Req})}{\sum_i w_{sp,i}} = \frac{\sum_i w_{sp,i} \cdot SKL_i(M_{Req})}{\sum_i w_{sp,i}} \tag{2}$$

In this case, the weights $w_{sp,i}$ are determined for the individual shift characteristics via the driver class and the load class.

A substantial advantage of this solution is that, since, as mentioned, the shift characteristics need only be present as a function, the number and the position of the interpolation points of the individual shift characteristics are independent of one another, with the result that there is a large degree of freedom in designing or configuring the gear shift characteristic diagrams.

The identification circuit 6 for the set output value functions as follows. A one-dimensional interpolation is used to uniquely determine the setpoints for an individual output, that is to say for an output signal of the fuzzy system 2. A prioritization of the outputs is performed for the purpose of assigning a driver intervention to the load output (signal) or driver output (signal) of the fuzzy classifier. This means that as soon as a load situation is established, only an adaptation of the load output of the fuzzy classifier is performed. If no load is detected, only the driver behavior is adapted. This mode of procedure ensures that the gear shifting on a flat road does not change in the case of an intervention by the driver on a hilly road. This is sensible to the extent that most vehicles are driven more rarely on hilly than on flat roads.

It has been described above how the gear shifting of a transmission controller is continuously adapted to different driver situations and load situations. Interventive operations of the driver also adapt the transmission controller 1, which has a driver identification and a load identification, to the driver's wishes. This is necessary, since a single tuning or adaptation of the transmission controller cannot cover all driver types which occur. In order to achieve the adaptability of the driver and load classifier, it is necessary to calculate, from a given driver intervention, i.e. a setting or determination of a set shift point, the output parameters of the driver and load classifier which are correct for this case. Since the parameters for the calculation of the shift points are derived from the output parameters of the classifier, it is necessary, in order to identify the set shift point, to determine its similarity to—in the simplest case its distance from—existing shift characteristic curves, in order to determine in turn the set output values of the classifier from this similarity.

The similarity of a shift point to a shift characteristic curve i is calculated via its distance $l_i$ from just this shift characteristic. How the distance is calculated in a one-dimensional direction in the case of a constant torque requirement is illustrated in FIG. 3. Since the similarity or the distance of a shift point should lie in a normalized fashion in the interval $[0, 1]$, this similarity $D_i$ of a shift characteristic curve i can be calculated with the equation $$D_i = 1 - \frac{|l_i|}{\sum_i |l_i|} \in [0, 1] \tag{3}$$

Here $D_i$ is the similarity value of a shift characteristic curve i with respect to a given shift point, and $l_i$ is the distance of a shift point from a shift characteristic curve i.

The distance measure thus defined is used to determine the set output values of the classifier as a function of the characteristic diagram modeling, that is to say the superimposition of the characteristic diagrams 25–27. Since the fuzzy classifier that is used outputs driver and load classes separately, it is necessary to prioritize in order to be able to undertake a unique assignment of the driver's correction wish. This prioritization can provide, for example, for an adaptation of the driver class only when no load situation is present.

Considering the driver classifier as an example, the set output value $O_{driver}$ results from the sum, weighted with the similarities $D_{eco}$ and $D_{sport}$, respectively, of the output values $$O_{driver} = D_{eco} \cdot O_{driver,eco} + D_{sport} \cdot O_{driver,sport} \tag{4}$$

$O_{driver,eco}$ and $O_{driver,sport}$, respectively, being the respective output values of the driver classifier for the driver attribute or driver property eco or sport.

An online-adaptive fuzzy classifier includes two circuit components (FIG. 1): the fuzzy system 2 for a driver detection and a load detection, and the adaptation component or adaptation circuit 5. During the operation of the fuzzy system 2, the fuzzy system 2 is observed or watched by the adaptation component 9, that is to say the latter continuously receives the input and output signals and the state variables of the fuzzy system 2. As soon as a driver intervention takes place, the identification circuit 6 calculates new set values for the outputs of the fuzzy system 2 and feeds them to the adaptation component 5. In this case, the latter requires information on the set values and actual values of the fuzzy system outputs, as well as on the input signals and on the state of the fuzzy system 2.

In order to adapt the fuzzy system 2 on the basis of the set data, actual data and state data, the activated output association functions are displaced or shifted in the direction of the set output value by an adaptation of the output association function. FIG. 4 shows an example for the output variable of driver behavior, in which two rules are activated. The output value of $driver_{actual}$ results from the superimposition of two rules, a rule $R_4$ classifying the driver as 70% normal, and a rule $R_1$ classifying the driver as 30% sporty.

The intervention of the driver sets a set value $driver_{set}$ which is more sporty than the $driver_{actual}$ value. The adaptation component 4, which can also be implemented by an adaptation algorithm in a computer, thereupon modifies the properties of normal and sporty, with the result that they approximate to the driver's wish (FIG. 5). If the driver keeps intervening in the same situation or in the same manner, after n adaptation steps the fuzzy system 2 sets itself entirely to the driving behavior of the driver.

Since this adaptation changes the output association functions of the fuzzy system 2, it is necessary to define a dedicated or separate output association function for each rule conclusion. However, it is thereby possible to adapt completely to the driver's wish—within the limits of the given gear shift characteristic diagrams. That is to say that, for example, a driver who always prefers the same gear shifting irrespective of his or her driving style can adapt the system such that all the output association functions of the variable driver behavior are situated at the same position. In this case, this position of the output association functions in the variable domain is absolutely determined by the shift program prescribed by the driver.

It is also possible for a system adapted by a driver to be "translated" back, and thus to obtain a rule set tuned to this driver by analyzing the new output association functions. This can be advantageous for future systems in which driver data are exchanged between different vehicles, since in principle the system supplies vehicle-independent driver data via the modified rule conclusions.

The structure of the fuzzy system 2 is selected such that the vehicle-specific adaptation of the system is performed in the input association functions and rule premises, while the online adaptation to the gear shifting behavior given by the driver intervention is performed in rule conclusions and output association functions. A driver-specific parameter set is generated from the adapted rule conclusions and/or the output association functions.

The driver-specific parameter set is stored in the onboard computer of the vehicle, and the different drivers are identified by their respective own uniquely characterized vehicle keys, codes or the like. The driver-specific parameter set is stored on a storage medium (memory card). A vehicle-independent, driver-specific data record which can be stored on a storage medium and transferred to other vehicles is generated from the adapted rule conclusions and/or output association functions.

We claim:

1. A controller for an automatic motor vehicle transmission, comprising:

characteristic diagram memories for storing a transmission shifting behavior as a function of vehicle operating parameters, the transmission shifting behavior being stored as characteristics including at least one of limit shift points and limit shift characteristic curves;

a fuzzy system connected to said characteristic diagram memories, said fuzzy system detecting the vehicle operating parameters and a vehicle load state and setting a transmission ratio as a function of the vehicle operating parameters and the vehicle load state using the characteristic diagram memories;

an input device for inputting driver instructions including plus shift instructions and minus shift instructions; and an adaptation circuit connected to said input device and to said fuzzy system, said adaptation circuit evaluating the driver instructions during a driving operation for adapting the transmission shifting behavior to a driver-desired transmission shifting behavior, and said adaptation circuit superimposing two of the characteristics stored in said characteristic diagram memories in a weighted fashion for setting a transmission shift point.

2. The controller according to claim 1, wherein said adaptation circuit superimposes two of the limit shift points stored in said characteristic diagram memories in a weighted fashion for setting the transmission shift point.

3. The controller according to claim 1, wherein said adaptation circuit superimposes two of the limit shift characteristic curves stored in said characteristic diagram memories in a weighted fashion for setting the transmission shift point.

4. The controller according to claim 1, wherein said adaptation circuit determines a set transmission shift point from at least one of the driver instructions, and weights the limit shift points by a respective distance from the set transmission shift point.

5. The controller according to claim 1, wherein said adaptation circuit determines a set transmission shift point from at least one of the driver instructions, and weights the limit shift points by a respective proximity to the set transmission shift point, the respective proximity is calculated using an equation $$D_i = 1 - \frac{|l_i|}{\sum_i |l_i|} \in [0, 1]$$

wherein $D_i$ is a proximity of a shift characteristic curve i to a given shift point, and $l_i$ is a distance between a shift point and the shift characteristic curve i.

6. The controller according to claim 1, including a characteristic diagram circuit connected to said fuzzy system for superimposing three of the limit shift characteristic curves.

7. The controller according to claim 1, wherein said fuzzy system includes a fuzzy classifier and supplies output signals including a load output signal and a driver behavior output signal, said adaptation circuit prioritizes the output signals of said fuzzy system such that only an adaptation of the load output signal of the fuzzy classifier is performed when a load situation is detected, and such that only an adaptation of the driver behavior output signal is performed when no load situation is detected.

8. The controller according to claim 1, including an identification memory connectable to said fuzzy system, said identification memory storing respective driving behaviors for drivers in the form of driver-specific data records obtained during an adaptation process.

9. The controller according to claim 1, including an external data memory for storing respective driving behaviors for drivers in the form of driver-specific data records obtained during an adaptation process.

* * * * *